United States Patent [19]

Mobley et al.

[11] Patent Number: 4,664,399

[45] Date of Patent: May 12, 1987

[54] VEHICLE TOWING DOLLY

[76] Inventors: Tommie Mobley, 5827 Eckleson St., Lakewood, Calif. 90713; Leon Amerson, 6124 Loma Vista Ave., Huntington Park, Calif. 90255

[21] Appl. No.: 617,674

[22] Filed: Jun. 5, 1984

[51] Int. Cl.[4] .......... B60S 13/02

[52] U.S. Cl. .......... 280/43.17; 280/43.24; 280/79.1 A; 414/495

[58] Field of Search .......... 280/43.11, 43.13, 43.14, 280/43.15, 43.16, 43.17, 43.24, 46, 7.12, 9, 10, 20; 254/8 C; 414/426, 430, 427, 495

[56] References Cited

U.S. PATENT DOCUMENTS

| | | | |
|---|---|---|---|
| 1,000,199 | 8/1911 | Sautter | 254/8 B |
| 1,134,211 | 4/1915 | McCalmont | 254/8 B |
| 1,171,049 | 2/1916 | Jeffery | 280/79.1 R |
| 1,196,690 | 8/1916 | Hofweber | 280/79.1 R |
| 2,554,365 | 5/1951 | Johnston, Jr. et al. | 254/8 B |
| 2,639,926 | 5/1953 | Parks | 280/47.15 |
| 2,801,864 | 8/1957 | Raney | 280/656 |
| 2,922,534 | 1/1960 | Vodnaska | 280/43.17 |
| 2,943,863 | 7/1960 | Carey | 414/426 |
| 3,035,812 | 5/1962 | Wineteer | 254/2 |
| 3,198,538 | 8/1965 | Nowell | 280/35 |
| 3,491,904 | 1/1970 | Field | 280/43.17 |
| 3,521,771 | 7/1970 | Nowell | 280/444 |
| 4,491,334 | 1/1985 | Tarbell | 280/43.17 |

FOREIGN PATENT DOCUMENTS

| | | | |
|---|---|---|---|
| 1578137 | 8/1969 | France | 280/47.21 |

*Primary Examiner*—David M. Mitchell

*Attorney, Agent, or Firm*—Knobbe, Martens, Olson & Bear

[57] ABSTRACT

A wheeled vehicle towing dolly adopted to elevate the front or rear wheels of a disabled vehicle, to enable its transportation by a tow truck or the like. In a lowered position the dolly chassis is adopted to secure the wheels of the vehicle. The dolly lifting mechanism at each wheel of the dolly is operative by a lever arm to raise the associated portion of the dolly chassis in a single pivoted movement. A locking mechanism secures the dolly chassis in its raised position.

5 Claims, 10 Drawing Figures

VEHICLE TOWING DOLLY

BACKGROUND OF THE INVENTION

1. Field of the Invention:

The present invention relates generally to towing devices for transporting disabled vehicles.

2. Description of the Prior Art:

In towing a disabled vehicle it is important to raise the wheels coupled to the transmission to avoid damage to the transmission. Various dollys have been proposed which are adopted to receive and capture a set of wheels for this purpose.

Some prior art devices, such as that shown in U.S. Pat. No. 2,943,863 (Cory), require a tow truck to hoist the vehicle onto the dolly. This is a slow procedure and requires considerable room to maneuver the tow truck. Other prior art devices, U.S. Pat. No. 3,035,812 (Winteer), being examplary, require hydraulic jacks to hoist the receptacles holding the wheels of the disabled vehicle. These devices are complex, expensive to manufacture, and present the danger of hydraulic jack failure and consequent dropping of the vehicle. Furthermore, such jacks require tedious, repetitious movements of the jack handle to achieve hoisting.

SUMMARY OF THE INVENTION

According to the present invention, a manually-operable towing dolly is provided which is capable of use with vehicles having various sizes of wheels. The construction of the dolly minimizes the time required for an operator to hoist and transport a disabled vehicle, and requires relatively little operator strength to do this. The dolly does not require use of auxiliary equipment such as a jack or a tow truck.

The dolly includes a plurality of locking means, each having a locking pawl which is spring-loaded to engage an extension of the associated dolly wheel axle to lock the dolly chassis in a raised position. Raising of the chassis is accomplished by articulated connection means extending between the axle extensions and the dolly chassis, the connection means each being mechanically activated in a single pivotal movement by a torque means operated by the user at each wheel.

The dolly and vehicle are towable when the dolly chassis is raised and locked in position by the respective locking pawls. The wheel support ramps on the dolly are adjustable to support vehicle wheels of different sizes.

Other objects and features of the invention will have become apparent from consideration of the following description taken in connection with the accompanying drawings.

DESCRIPTION OF A PREFERRED EMBODIMENT

Figure 1:
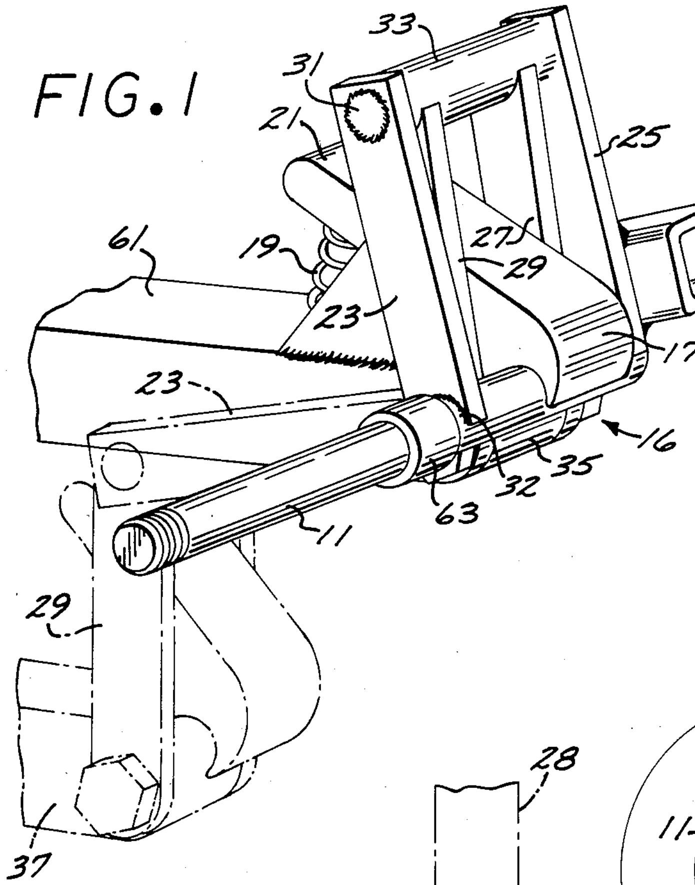
FIG. 1 is a perspective view of left rear wheel portion of the four wheeled vehicle towing dolly according to the present invention.
Figure 2:
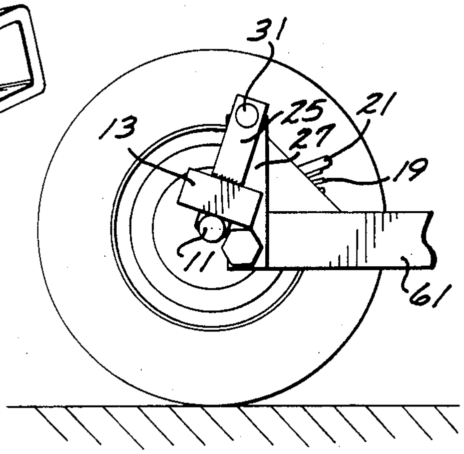
FIG. 2 is a side elevational view of dolly portion of FIG. 1, viewed from the opposite side and illustrating the dolly chassis in a raised, locked position.
Figure 10:
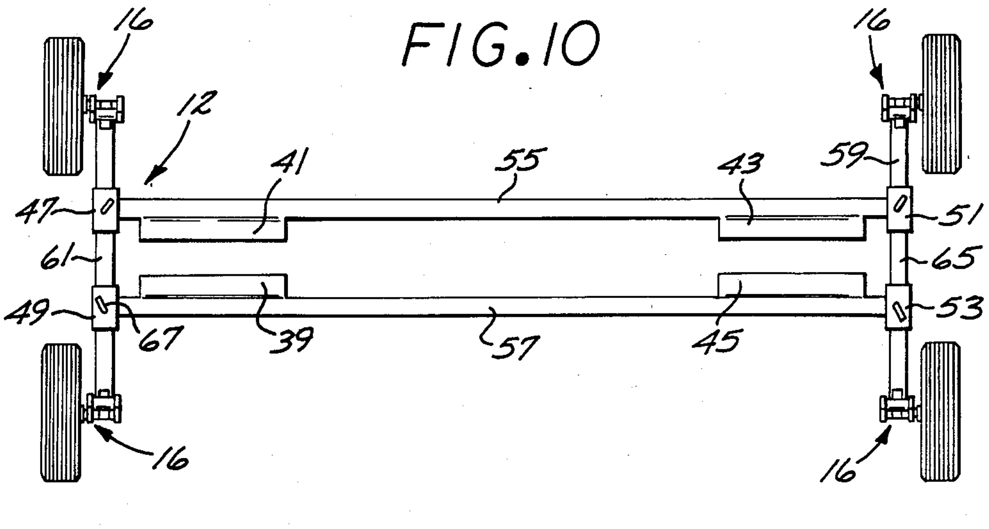
FIG. 10 is a top plan view of the dolly, including the left rear wheel portion shown in the previous views.

Referring to FIGS. 1 and 10, there is shown a vehicle towing dolly according to the present invention and comprising a four wheeled dolly chassis 12, having longitudinally-spaced apart, laterally-extending and horizontally-oriented rails 55 and 57. Rails 55 and 57 are adjustably supported at their opposite ends by a pair of longitudinally-extending, laterally-spaced apart rails 61 and 65. Each of the four wheel portions or corners of the dolly mount articulated connection means 16. When the connection means 16 at all four of the dolly wheels are unlocked, the chassis 12 is lowered into engagement with the roadway, and the vehicle to be towed may be driven over one of the rails 56 and 57 and onto pairs of confronting wheel support ramps 39 and 41, located at the left side of the chassis, and ramps 43 and 45 located at the other side of the chassis. The confronting ramps are downwardly inclined toward each other, and are welded to the associated horizontal rails.

Referring to FIGS. 1–5, the ends of the longitudinal rails 61 and 65 each fixedly mount a pair of laterally-spaced apart chassis arms 27 and 29 which also form a part of each articulated connection means 16. The arms 27 are secured to a sleeve 33 which pivotally receives a pivot rod 31 carried by a pair of spaced apart axle arms 23 and 25 which also form a part of the means 16, the arms 25 being fixed at their opposite ends to an extension or spindle of an axle 11 rotatably supporting the associated dolly wheel.

Figure 3:
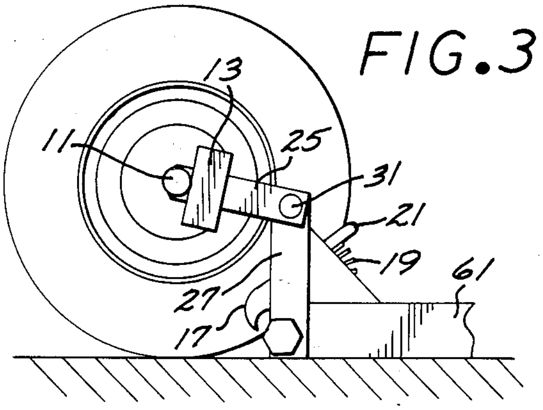
FIG. 3 is a view similar to FIG. 2, but illustrating the dolly position in a lowered, unlocked position.

The inner side of each axle arm 25 mounts a torque arm attachment means in the form of a receptacle or socket 13 receives and engages the operator-held torque means including means adapted to receive one end of a lever or torque arm 28. Pivotal movement by the operator of the torque arm 28 in a counterclockwise direction, as seen in FIG. 3, raises the associated corner of the dolly chassis 12 to the position of FIGS. 1 and 2.

The counterclockwise movement of each of the axle arms 25 is accomplished with a single, swift movement made easy by the rise of a relatively long torque arm 28.

Each connection means 16 includes a latching means or pawl 17 which, as best seen in FIGS. 1 and 4–9, includes a pivot portion 18, pivotally mounted between the associated chassis arms 27 and 29 and to the chassis rail 61 or 65, as the case may be, by means of a shaft 20 which extends through the chassis arms 27 and 29. Each pawl 17 includes a handle 21 and an arcuate detent adapted to fit over the axle 11. The pawl 17 is biased toward the axle 11 by a compression spring 19 suitably secured at its opposite end to the chassis rail 61 or 65. Movement of the pawl 17 under the bias of the spring 19 is limited by a suitable stop 69 fixed to the chassis arm 27 as seen in FIGS. 6–9.

The solid lines of FIG. 1 show the pawl 17 in a locked position, gripping the axle 11, while the phantom lines show the pawl 17 disengaged from the axle 11.

Figure 6:
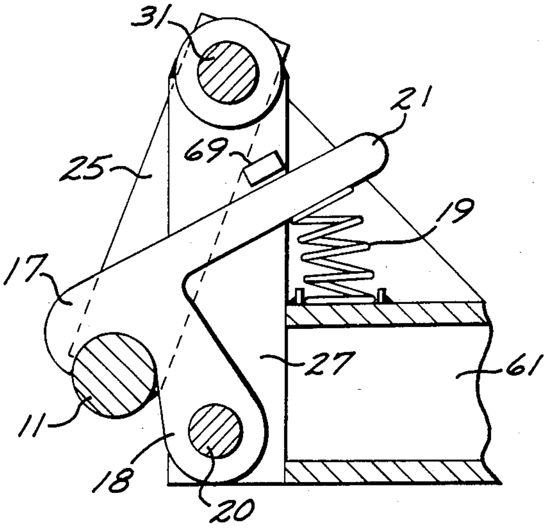
FIGS. 6–9 show successive positions of the dolly portion, proceeding from the partially raised position of FIG. 8, and through the positions of FIGS. 9 and 7 to the locked position of FIG. 6.
Figure 7:
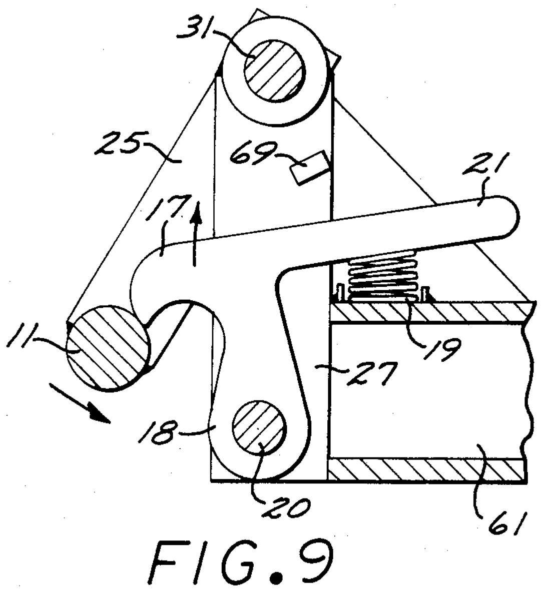
Figure 8:
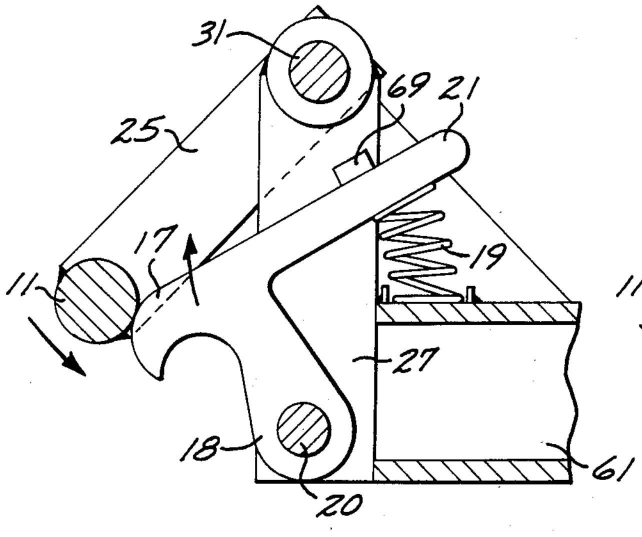
Figure 9:
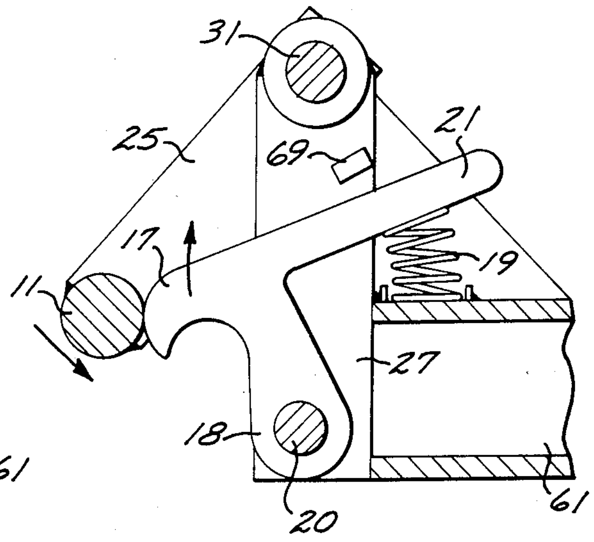

On initially pivoting axle arm 25 to raise the associated portion of the chassis 12, the pawl 17 engages the underside of the axle 11, is seen in FIG. 8. Further raising of the chassis 12 rotates the pawl 17 clockwise, as seen in FIG. 9 enabling the pawl 17 to clear the axle 11, as seen in FIG. 7. Axle 11 rides down the arcuate detent of pawl 17, receiving the axle 11 in the pawl detent, and locking the chassis 12 in its raised position, as seen in FIG. 6 and 7.

Figure 4:
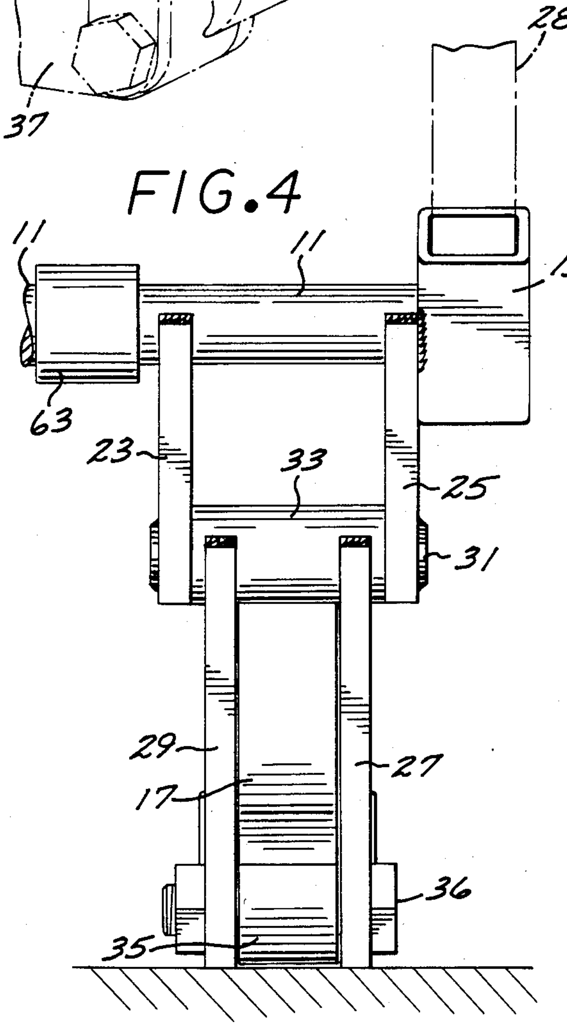
FIG. 4 is a front elevational view of the dolly portion.
Figure 5:
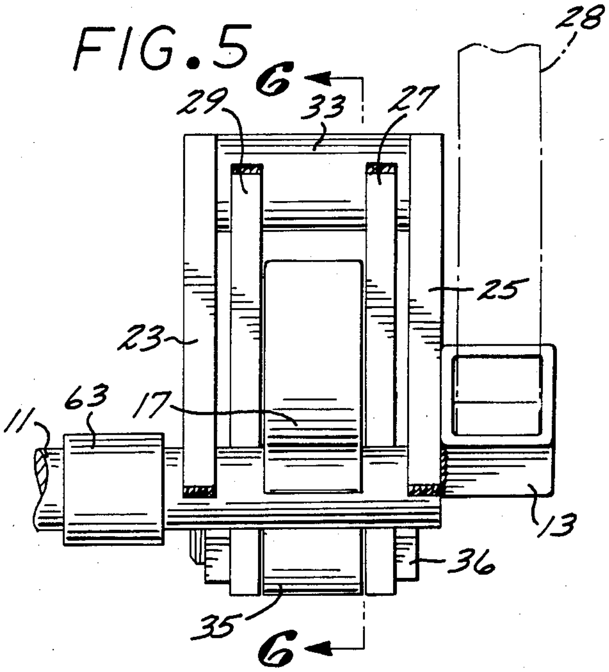
FIG. 5. is a view similar to FIG. 4, but illustrating the dolly portion in the position of FIGS. 1 and 2.

In order to lower the chassis 12, the operator presses upon the pawl handle 21, optionally utilizing the end of the lever arm for assistance by pushing the lever arm against pawl handle 21, thereby compressing spring 19 and releasing the pawl 17 from the spindle 11. The weight of the dolly chassis 12 causes it to drop to the ground or pavement, as seen in FIGS. 3 and 4.

The wheel support ramps 41 and 43 are moveable toward and away from the ramps 39 and 45 to accommodate vehicle wheels of different sizes. For this purpose the ends of the horizontal rails 55 and 57 mount collars 47, 49, 51 and 53 which are longitudinally slidably fitted over rails 61 and 65. Each collar can be tightened in adjusted position by a screw 67 extending through the collar and into engagement with the rail 61 or 65, as the case may be.

The dolly components are preferably constructed of hardened steel.

Various modifications and changes may be made with regard to the foregoing detailed description without departing from the spirit of the invention.

We claim:

1. A vehicle towing dolly for receiving a pair of vehicle wheels and comprising:

a frame, having a lowered position on the ground and a raised position above the ground, and including wheel support portions to receive the pair of vehicle wheels and to constrain said vehicle wheels movement;

two pair of dolly wheels for disposition on the ground on opposite sides of said pair of vehicle wheels, and including axle means associated with each of said pairs of dolly wheels;

pivot means mounted on said frame having a first position when said frame is in said lowered position and a second position when said frame is in said raised position;

link means, pivotally connected on one end to said pivot means, rotatable in a first direction to said raised position and in a second direction to said lowered position, and connected on the opposite end with one of said axle means, said link means having a length sufficient to lower said frame to said lowered position, when said link means is rotated in said first direction and to carry said frame upwardly to said raised position when said link means is rotated in said second direction;

a pawl pivotally mounted on said frame, for movement with said frame relative to said axle means, to be carried into releasable contact with said axle means as said link means approaches said raised position, said pawl formed with an insert capture detent for releasable insert of said axle means for receiving and capturing said one of said axle means to lock said link means against rotation in said second direction, said pawl being formed with a cam surface disposed for engagement with said axle means as said link means approaches said raised position, and when engaged by said axle means, configured to be pivoted thereby to orbit said cam surface clear of said axle means and to register said detent over said axle means to capture said axle means and to lock said link means against rotation in said second direction thereby locking said frame relative to said axle means; and, lever arm means mounted on said link means for rotating said link means in said first direction, for impelling said pivot means from said first position to said second position, and elevating said frame to said raised position, whereby after said vehicle wheels have been rolled onto said frame, said lever arm means may be rotated, thereby rotating said link means in said first direction to raise said frame relative to said axle means to draw said axle into engagement with said cam surface to pivot said pawl to orbit said cam surface clear of said axle means such that continued rotation of said link means in said first direction will engage said axle means within said detent to lock said axle means and said frame against relative movement.

2. A vehicle towing dolly according to claim 1 wherein said wheel support portions are movable toward and away from each other to accommodate vehicle wheels of different sizes.

3. A vehicle towing dolly according to claim 1 wherein said chassis includes a pair of longitudinally extending rails, a pair of horizontal rails, and a plurality of collars carried at the ends of said horizontal rails, and longitudinally slidable upon said longitudinally extending rails whereby said rails may be moved toward and away from each other to accommodate vehicle wheels of different sizes.

4. A vehicle towing dolly according to claim 3 wherein each said collar includes a locking screw engageable with an associated one of said longitudinally extending rails for fixing said horizontal rails in adjusted position.

5. A vehicle towing dolly in accordance with claim 2 wherein said chassis includes a pair of extending rails, a pair of horizontal rails, and a plurality of collars carried at the ends of said horizontal rails, and longitudinally slidable upon said longitudinally extending rails whereby said rails may be move toward and away from each other to accommodate vehicle wheels of different sizes.

* * * * *